United States Patent [19]
Olsen et al.

[11] 3,809,795
[45] May 7, 1974

[54] MEANS FOR ADJUSTING A CONDUCTOR IN HIGH VOLTAGE ELECTRICAL EQUIPMENT

[75] Inventors: Willi Olsen; Dieter Lorenz, both of Berlin, Germany

[73] Assignee: Siemens Aktiengesellschaft, Munchen, Germany

[22] Filed: Nov. 2, 1972

[21] Appl. No.: 303,081

[30] Foreign Application Priority Data
Nov. 21, 1971 Germany............................. 2157101

[52] U.S. Cl................ 174/28, 174/73 R, 174/99 R
[51] Int. Cl. ............................................. H01b 9/04
[58] Field of Search........ 174/21 C, 22 C, 23 R, 28, 174/99 R, 99 B, 73 R, 161 R

[56] References Cited
FOREIGN PATENTS OR APPLICATIONS
1,396,983   3/1965   France.................................. 174/28

Primary Examiner—Laramie E. Askin
Attorney, Agent, or Firm—Kenyon & Kenyon Reilly Carr & Chapin

[57] ABSTRACT

High voltage electrical equipment using a high voltage electric conductor within a substantially cylindrical metal enclosure forming a space around the conductor has an electrically non-conductive annular spacer holding the conductor centrally within the enclosure, the spacer being shaped and connected in an adjustable manner with the enclosure in a manner permitting the conductor to be moved laterally to position it concentrically within the enclosure.

10 Claims, 4 Drawing Figures

MEANS FOR ADJUSTING A CONDUCTOR IN HIGH VOLTAGE ELECTRICAL EQUIPMENT

BACKGROUND OF THE INVENTION

Metal clad high voltage switching systems, high voltage conductors and possibly other electrical equipment, involve the combination of a high voltage electric conductor within a substantially cylindrical metal enclosure forming a space around the conductor, and an electrically non-conductive or insulating annular spacer forming a central passage holding the conductor and a peripheral rim concentric with this passage and attached to the enclosure's interior.

The space between the conductor and the enclosure may be filled with a compressed gas dielectric, such as sulfur hexafluoride, in which event the spacer may be required to form a gas-tight partition.

With the conductor carrying a high voltage electric current, such as a voltage in the area of 220 kilovolts, an electrostatic field exists between the conductor and the metal enclosure because the latter is electrically grounded in the interest of safety. If the spacer does not hold the conductor concentrically within the enclosure, concentrations of the electrostatic field on the side of the enclosure to which the conductor is closest may develop, which is, of course, undesirable. If the spacer is connected to the enclosure in such a manner as to involve projections extending inwardly from the inside of the enclosure or which involves parts of irregular shapes, such undesirable field concentrations may also occur. In other words, the spacer must hold the conductor concentrically within the enclosure and the spacer must be connected with the inside of the enclosure so as to avoid projecting or irregularly shaped parts of a nature causing electrostatic field concentrations.

DESCRIPTION OF THE PRIOR ART

The prior art, insofar as it is known, teaches the use of a disc-shaped insulator having a central portion forming a passage for holding the conductor and a rim concentric with this passage. The enclosure is formed with an annular shoulder of relatively small radial extent, the insulator has its peripheral portions butted axially against this shoulder and a ring is telescoped within the enclosure and pressed against the peripheral portion of the space on its side opposite to that butted against the shoulder, the spacer being thus attached to the inside of the enclosure. Examples are shown by U.S. Pat. Nos. 3,573,341 and 3,573,342, both granted to Graybill et al., Apr. 6, 1971.

The above arrangement requires relative extensive and accurate machining operations to insure that all of the inter-fitting parts are precisely shaped and positioned relative to each other so that the insulator is truely held co-axially within the cylindrical enclosure in a gas-tight manner. Great accuracy is required to avoid looseness between the various interengaging surfaces while at the same time avoiding undue mechanical stressing of the spacer which is, of course, made of a nonmetallic material.

SUMMARY OF THE INVENTION

The object of the present invention is to provide such a spacer and means for connecting it with the enclosure in a form which is less expensive than the prior art arrangement and which permits precise location of the conductor co-axially within the enclosure regardless of slight manufacturing inaccuracies or because of dearrangements resulting from shipment or handling of the equipment involved. 6, 1971.

According to this invention, the spacer, of course made of an electrically insulating material, is shaped so that its portion forming the conductor passage is axially offset from its rim which is attached to the enclosure's inside. This spacer may have the form of a hollow conical shape, for example, the conductor passage being formed in the apex and the spacer having a peripheral rim which need be only approximately concentric with this passage. Extreme manufacturing precision is not required.

In addition, the enclosure is provided with an inwardly extending annular shoulder and this rim is connected with this shoulder at a plurality of locations which are circumferentially interspaced, preferably uniformly. The rim is axially spaced from the shoulder and means at each of the locations are provided for adjustably connecting the rim to this shoulder so that the spacing therebetween may be adjustably varied. By adjusting the various means to vary the spacing, the spacer may be tilted somewhat in any angular direction relative to the axis of the enclosure, thus providing for lateral movement of the conductor relative to the enclosure.

It follows that regardless of manufacturing inaccuracies within reasonable tolerance ranges, this adjustability permits the conductor to be brought to a position truely concentric with the inside of the cylindrical enclosure. Furthermore, the adjustment may be made either by the manufacturer of the equipment involved or in the field during the installation of the equipment.

The shoulder may be located in an annular recess formed in the enclosure with the shoulder and the spacer's rim both within this recess and, therefore, avoiding the formation of projections extending inwardly beyond the level of the enclosure's inside. Therefore, assuming the connecting means to be formed of metal and that the shoulder is also metal, these elements do not project inwardly from the enclosure's inside. Because these parts are necessarily of an irregular shape, metal electrode surfaces are provided which are located between these parts and the conductor. These surfaces may be smooth and rounded so as to prevent concentration of the electrostatic field to an extent resulting in arcing or other troubles.

Seals are used to seal off the peripheral space formed by the various parts between the spacer's rim and the enclosure's inside. When the sealing arrangement results in parts protruding inside of the level of the inside of the enclosure, electrodes provide protection against electrostatic field concentrations which might cause trouble.

DESCRIPTION OF THE DRAWINGS

Preferred embodiments of this invention are illustrated by the accompanying drawings, the various figures being as follows.

DESCRIPTION OF THE PREFERRED EMBODIMENTS

Figure 1:
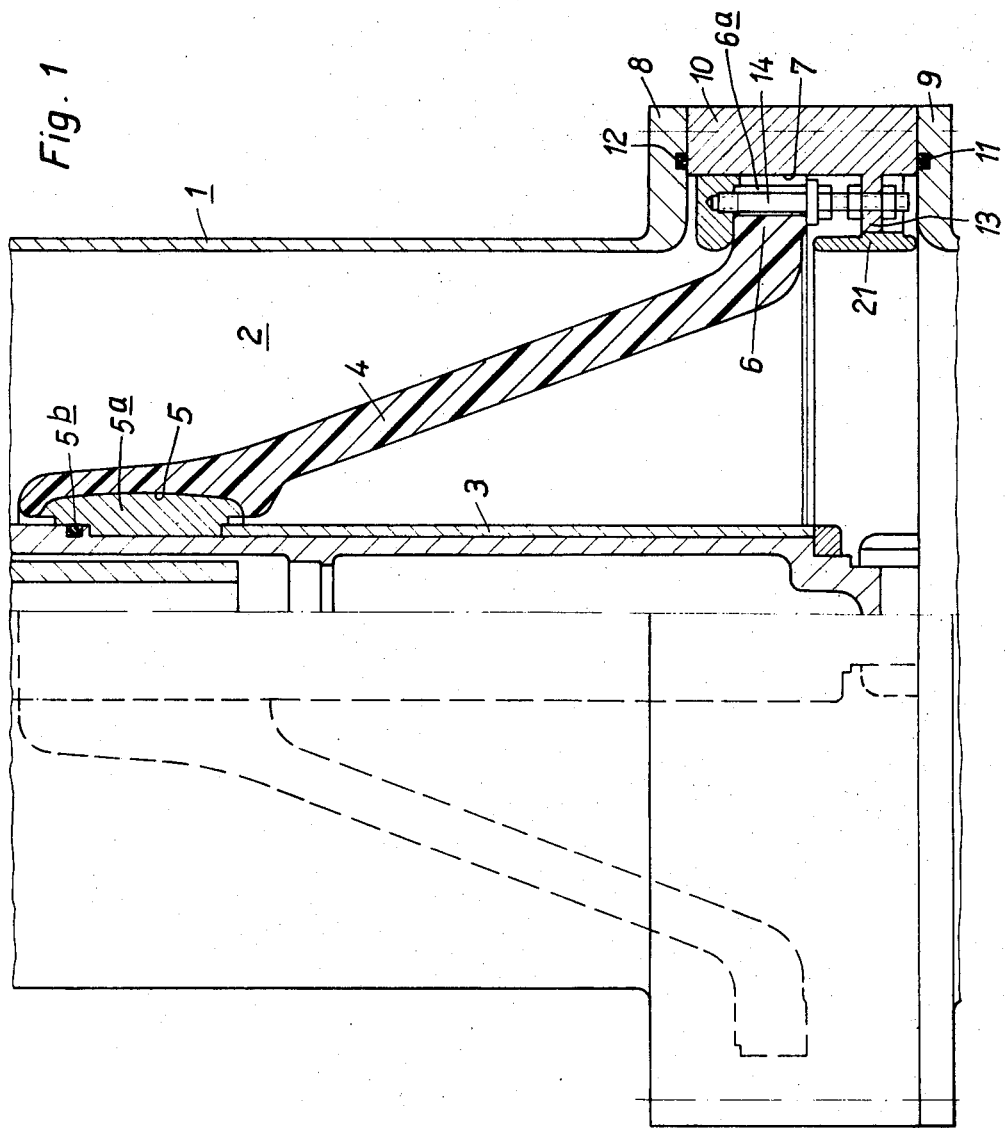
FIG. 1, half in elevation and half in longitudinal section, shows a first embodiment.

In FIG. 1 the cylindrical metal enclosure 1 of a high voltage equipment operation at 220 kilovolts, forms a space 2 around the conductor 3 carrying electric current at the described potential. The electrically non-conductive annular spacer 4 forms the central passage 5 for holding the conductor 3, and the peripheral rim 6 which in the prior art constructions would have to have its peripheral edge exactly concentric with the axis of the passage 5, requiring manufacturing precision with its attendant expense. In the present instance this rim 6 needs to be only approximately concentric with the axis of the passage 5, thus avoiding such expense. However, precise concentricity of the parts, if desired, does not affect the operation or advantages of the present invention.

Figure 3:
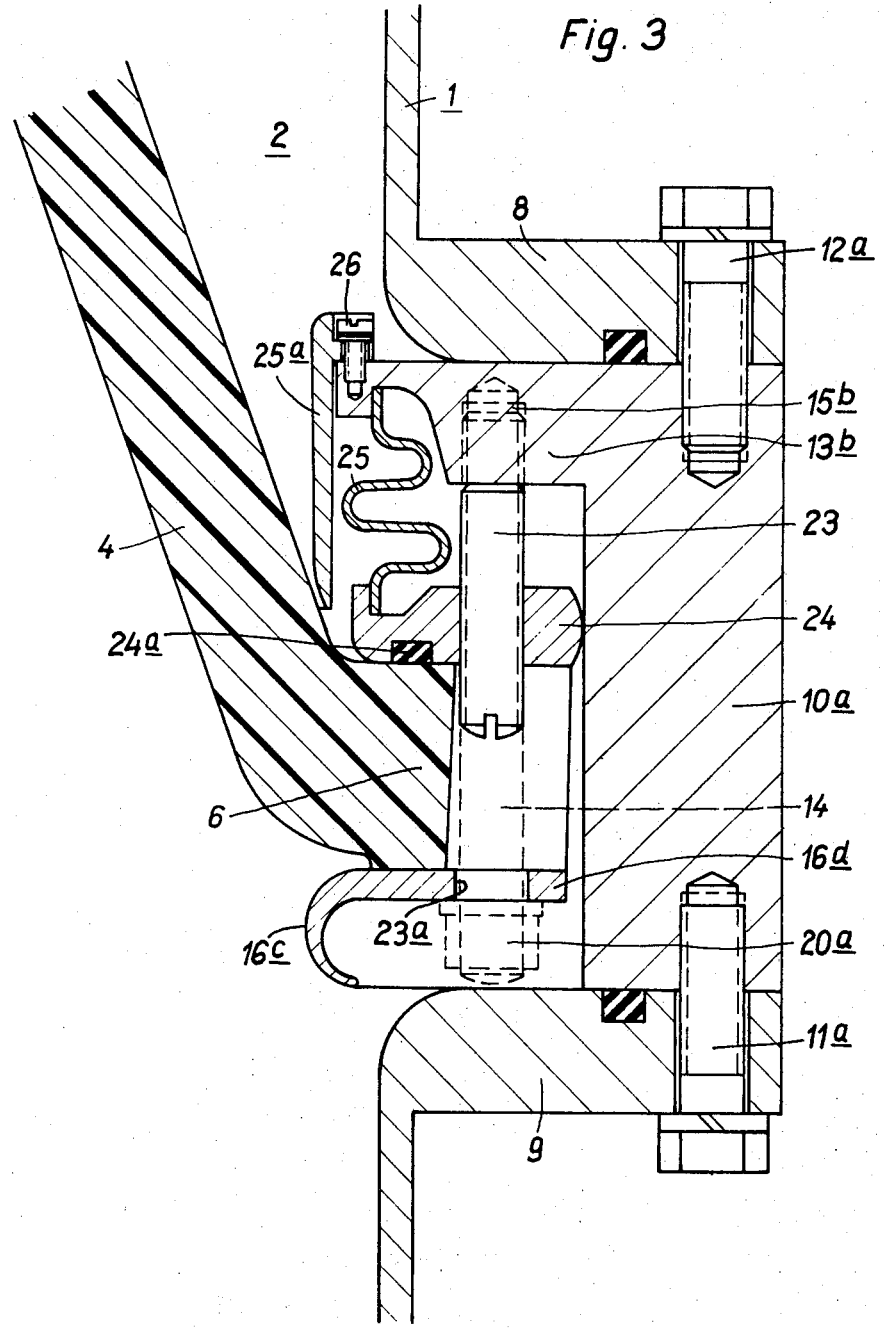
FIG. 3 shows a second preferred embodiment in the same manner as FIG. 2.

The enclosure 1 provides the recess 7 into which the rim 6 extends, this rim being in the form of a flange. The recess 7 is formed by reason of the cylindrical enclosure 1 being formed with flanges 8 and 9 interspaced by a cylindrical metal ring 10 of less thickness than the radial extent of the flanges 8 and 9 and sealed gas-tight with respect to these flanges by seals 11 and 12. As can be seen in FIG. 3, the flanges 8 and 9 are connected to the axial ends of the cylindrical ring 10 by cap screws 11a and 12a screwed into tapped holes in the ends of the ring. There is, of course, a peripheral series of these cap screws and which with the seals 11 and 12 provide an assembly forming the recess 7 in a gas-tight manner.

Internally the ring 10 forms an integrally projecting annular shoulder 13. The enclosure 1, the ring 10 and the shoulder 13, operate electrically at ground potential and an electrostatic field exists between them and the high voltage conductor 3. As illustrated, the inner edge of the annular shoulder 13 lies within the cylindrical plane of the inside of the enclosure 1, the shoulder being within the recess 7.

In this first embodiment the rim 6 is formed with a plurality of radial slots 6a, the slots being interspaced uniformly around the periphery and used in adequate number to avoid localized mechanical stressing due to spacer attachment forces being applied to the rim 6 around the peripheries of the inner ends of the slots, at least to a degree that might unduly stress the spacer 4 and particularly its rim 6. In one practical form of the present invention, sixteen of these slots are provided.

Figure 2:
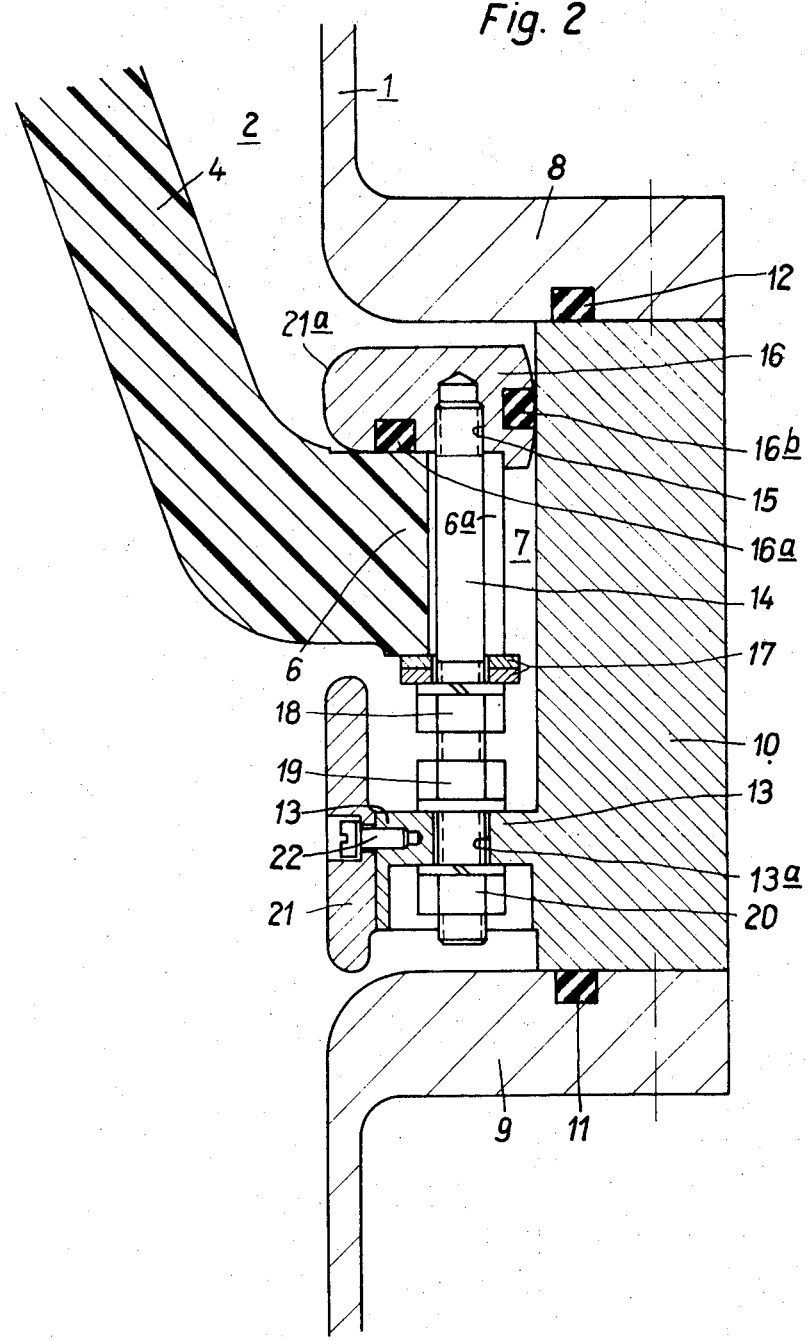
FIG. 2 shows on an enlarged scale the details shown by the lower right-hand corner of FIG. 1.

The construction shown on an enlarged scale by FIG. 2 is used at each of the slots 6a. At each of these locations the shoulder 13 is formed with an unthreaded hole 13a through which a stay bolt 14 is passed upwardly with respect to the orientation shown by FIG. 2, this stay bolt passing through the slot 6a with its upper end screwed into a tapped hole 15 formed in a flat metal mechanical-stress distributing ring 16 engaging the top of the rim 6. This ring has seals 16a and 16b respectively engaging the top of the rim 6 and the inside of the cylindrical ring 10, thus providing for fluid tightness for confining compressed gas, for example, in the space 2. Solid metal washers 17 engage the bottom side of the rim 6 with a nut 18 below them. The stay bolt 14 may be screwed tightly into the hole 15 and the nut 18 may be tightened so that the rim 6 is clamped firmly between these parts at the various circumferentially interspaced locations established by the slots 6a, and, of course, the holes 13a. Nuts 19 and 20 are screwed on the stay bolt 14 above and below the shoulder 13.

Now it can be seen that at each of the various circumferentially interspaced locations, by loosening one of the nuts 19–20 and tightening the other, the space between the rim 6 and the shoulder 13 may be varied. This in turn imparts a tilting action to the hollow conical spacer 4. The ring 16 has a convex or rocker edge engaging the inside of the cylindrical ring 10 so that the ring can rock slightly; for the same reason the spacer's conductor passage 5 engages the conductor through a ring 5a permitting slight rocking action between it and the spacer 4, this ring having a seal 5b providing a fluid tight joint relative to the conductor 3.

Note that all of the parts adjustably attaching the insulator's rim to the shoulder 13 lie within the recess 7 and therefore do not form projections extending inwardly towards the conductor beyond the plane of the inside of the cylindrical enclosure 1. The angular deviations required to adjust the conductor 3 precisely concentric with the enclosure 1 are ordinarily rather small. They are required to correct for relatively small dimensional and shape variations occurring during the manufacture of the parts, and to return the conductor to its proper concentric position if dearranged by the handling of the equipment during its shipment or installation.

Although the various parts are within the recess as described, they of necessity are potential sources of trouble because of their irregular shapes and because they provide points, corners and the like. Therefore, a cylindrical electrode 21 is provided, this being mounted by screws 22 to the inner edge of the shoulder 13 and being long enough axially to substantially completely shield the parts below the spacer's rim 6 from the conductor. This electode is, of course, made of metal and is in electrically conductive connection not only with the shoulder but with the stay bolt and its various nuts and other parts. The top and bottom edges of this electrode 21 are smoothly mounted. The electrode is, of course, at ground potential, its inner surface being in the plane of the inside of the enclosure 1. The electrode 21 may be removed by removing the screws 22 to give access to the adjustment nuts 19–20, the electrode being installed after the conductor is brought to its true concentric position. The inner edge of the ring 16 is also rounded as at 21a so that it acts correspondingly to reduce the inevitable electrostatic field to a level approximating that existing on the inside of the enclosure 1, this round inner edge of the ring 16 also being substantially in the plane of the inside of the enclosure 1.

In the second embodiment shown by FIG. 3, the ring 10a corresponding to the ring 10, forms the shoulder 13b at its upper end, the stay bolt 14 in this instance being beyond the plane of the FIG. 3 section and, therefore, being shown in broken lines. In this instance the stay bolt operates as a tension member instead of a column as in FIG. 2, the upper end of the stay bolt being screwed in the tapped hole 15b and its lower end having a nut 20a which through a mechanical stress distributing ring 16d applies an upward thrust to the rim 6. In the plane of FIG. 3 is shown a compression screw 23 which is in screw-threaded engagement with an upper mechanical stress distributing ring 24 bearing on the top of the rim 6 and with its upper end riding freely in a hole formed in the shoulder 13b. By tightening or loosening one or another of the screw 23 and the nut 20a, the rim 6 may be adjustably spaced relative to the shoulder 13b. A hole 23a in the ring 16d forms a screw driver passage for working the screw 23. Here again, the parts are all made of metal so the front edge of the ring 16d is formed in the shape of a skirt to provide a suitably shaped electrode 16c.

In this instance, to provide fluid tightness, a metallic bellows 25 is used, this having one end welded to the shoulder 13b and its other end welded to the ring 24, the ring 24 having a seal 24a bearing against the upper side of the rim 6. In this way the space 2 is closed fluid tightly. An electrode 25a in the form of a smoothly surfaced cylinder is attached by screws 26 to the shoulder 13b. This electrode depends like a skirt so as to cover the bellows 25 and, of course, the bolt 14 and screw 23. The nut 20a is covered by the electrode 16c of the ring 16d.

It is to be noted that in this FIG. 3 embodiment the shoulder 13b and the ring 24 project inwardly with respect to the cylindrical plane of the inside of the enclosure 1. The electrode 25a provides the protection against excessive electrostatic field build-up.

Figure 4:
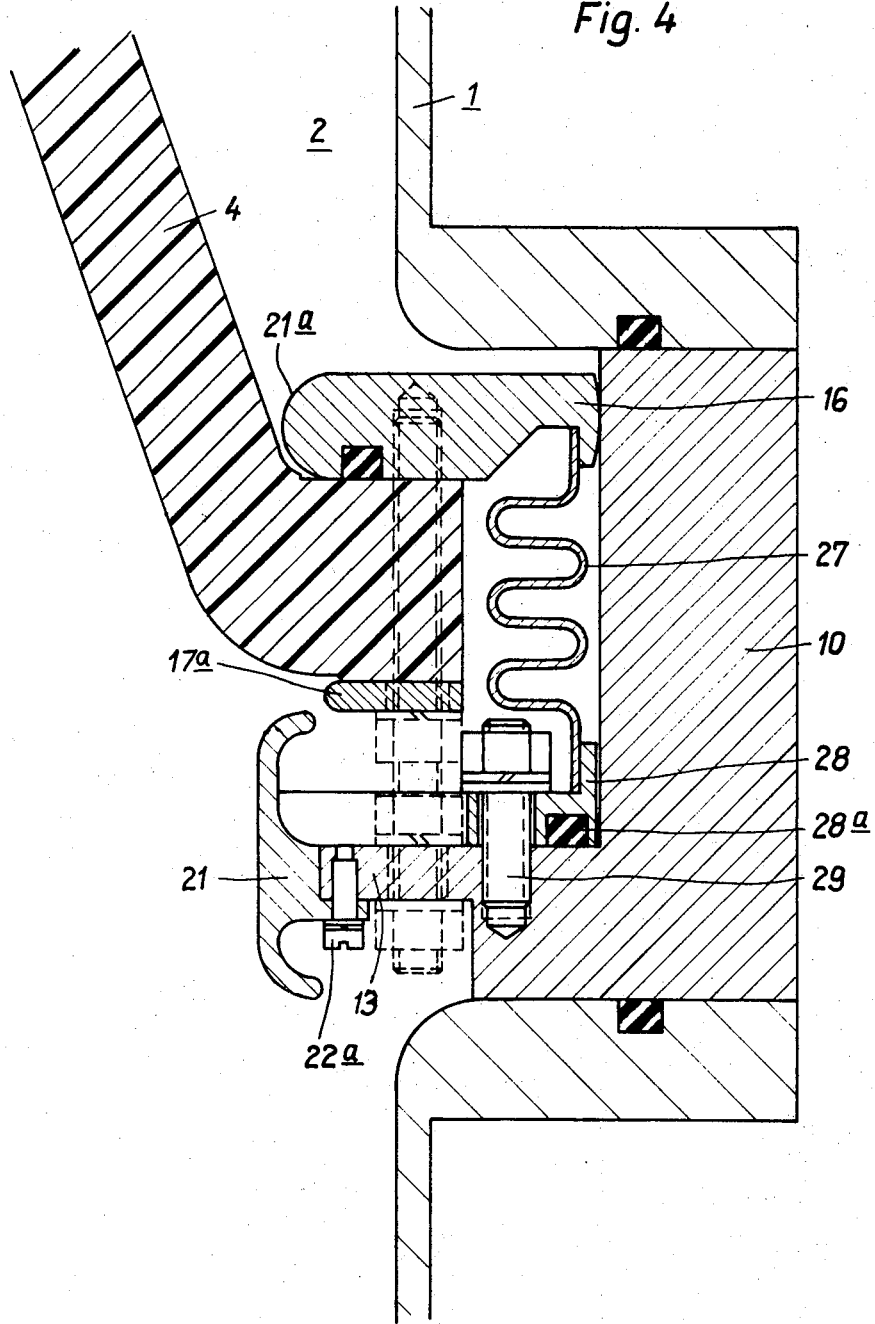
FIG. 4 is like FIG. 3 but shows a third preferred embodiment.

In the third embodiment shown by FIG. 4 substantially the same parts are used as in the case of the first embodiment of FIG. 2, and although these parts are somewhat differently shaped and project inwardly from the recess 7, the curved face 21a and the electrode 21 provide the protection against excessive electrostatic field concentrations. The difference in this instance is that the seal 16b of the first embodiment is replaced by a metal bellows 27 having its upper end welded to the ring 16 and its lower end welded to a seal ring 28 clamped downwardly on the top of the shoulder 13 by screw fastenings 29, a seal 28a providing gas tightness. The screw 22a corresponds to the screw 22 in the first embodiment, and a flat ring 17a performs the same function of the washers 17, the inner edge of this ring being smoothly rounded.

In all of the embodiments it is to be understood that clearance space must be provided between the various parts to permit the tilting action of the hollow conical insulating spacer, but these clearances may be very small since the tilting action required is small. In all instances the tilting action is in the form of thrust exerted axially at the various locations around the periphery or rim of the spacer so there is little chance for undue mechanical stress of the latter, such as might result in breakage. With the screws 12a, shown only in FIG. 3, but used in other instances also, holding the cylindrical ring 10a as part of the upper section of the enclosure, in the embodiment shown by FIGS. 2 and 4 the adjustment is made by way of the nuts 19-20 with the electrode 21 removed. This adjustment must be made by using end wrenches operating radially within the enclosure. However, in the case of the FIG. 3 embodiment a screw driver is used to adjust the screw 23 and a socket wrench for adjusting the nuts 20a, the access being in an axial direction with respect to the enclosure. After the conductor is brought to its exact co-axial position, and the various screw fastenings are tightened, the lower section of the enclosure providing the flange 9, may be attached by the use of the cap screws 11a.

It can be seen that when the invention is used for a conduit gas-filled by the manufacturer, that with the ring 10 or 10a and the other parts, the conduit may be shipped with the space 2 gas filled under pressure.

In all cases the precision manufacturing technique required by the prior art construction is unnecessary. Relatively large manufacturing tolerances may prevail while at the same time the conductor ultimately may be exactly co-axially positioned with the cylindrical enclosure.

What is claimed is:

1. The combination of a high-voltage electric conductor within a substantially cylindrical metal enclosure defining a longitudinal axis and forming a space around the conductor, and an electrically non-conductive annular spacer forming a central passage for the conductor and a peripheral rim normally concentric with this passage and attached to the enclosure; wherein the improvement comprises a plurality of circumferentially located adjustable means between said rim and said enclosure for tilting the spacer angularly relative to the longitudinal axis of the enclosure whereby the conductor is displaced laterally relative to the enclosure.

2. The combination of a high-voltage electric conductor within a substantially cylindrical metal enclosure forming a space around the conductor, and an electrically non-conductive annular spacer forming a central passage for the conductor and a peripheral rim normally concentric with this passage and attached to the enclosure; wherein the improvement comprises a plurality of circumferentially located adjustable means between said rim and said enclosure, said adjustable means including an inwardly extending annular shoulder connected to said enclosure and axially spaced from said rim, and means interconnecting said shoulder and rim at a plurality of circumferentially interspaced locations and with adjustable axial interspacing of the shoulder and rim at each of these locations, said spacer being shaped so that its portion forming said passage is axially offset from said rim and the latter being at least approximately concentric with this passage.

3. The combination of claim 2 in which said last-mentioned means are screw-threaded members at said locations applying holding force to the axially opposite sides of said rim and in axial directions with respect to said spacer.

4. The combination of claim 3 in which said enclosure forms an outwardly extending annular recess in which said shoulder is located and into which said rim extends with said members in this recess.

5. The combination of claim 3 in which said shoulder and members are made of metal and are electrically conductively connected with said metal enclosure, and including an annular metal electrode electrically connected to said shoulder and interposed between said members and said conductor, the side of said electrode facing the conductor being shaped to provide electrostatic field concentrations which are reduced as compared to those which said members would provide in the absence of said electrode.

6. The combination of claim 3 in which a metal ring is positioned on one axially facing side of said rim and is engaged by said members, the latter and said shoulder being metallic and electrically conductively connected with said enclosure, the surface of said ring facing said conductor being smoothly rounded to form an electrode for reducing electrostatic field concentrations thereon.

7. The combination of claim 3 in which stress-distributing rings are positioned on both of said rim's sides, said members applying said force to said rings.

8. The combination of claim 7 in which screw-threaded members include compression screws in screw-threaded engagement with the one of said rings opposite to said shoulder and having ends bearing against the shoulder, and bolts having ends in screw-threaded engagement with said shoulder and nuts engaging the other of said rings.

9. The combination of claim 3 in which at least one stress-distributing ring is positioned on one side of said rim and receives the force of said screw-threaded members on that side, and a metal bellows seals the space between said ring and the shoulder.

10. The combination of claim 9 in which a cylindrical electrode is connected to said shoulder at a location interspaced between said bellows and said conductor.

* * * * *